(12) United States Patent
Etou (10) Patent No.: US 7,014,004 B2
(45) Date of Patent: Mar. 21, 2006

(54) FRAME ASSEMBLY FOR SNOWMOBILE

(75) Inventor: Toyochika Etou, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 284 days.

(21) Appl. No.: 10/214,915

(22) Filed: Aug. 7, 2002

(65) Prior Publication Data

US 2003/0029659 A1 Feb. 13, 2003

(30) Foreign Application Priority Data

Aug. 9, 2001 (JP) .................................. 2001-241550

(51) Int. Cl.
*B62M 27/02* (2006.01)

(52) U.S. Cl. ........................................ 180/190; 280/16
(58) Field of Classification Search ................. 180/182, 180/190, 186, 181, 191–195; 280/15.17, 280/21.1
See application file for complete search history.

(56) References Cited

U.S. PATENT DOCUMENTS

| | | | | |
|---|---|---|---|---|
| 3,840,083 A | * | 10/1974 | Woods | ........................ 180/312 |
| 4,620,604 A | * | 11/1986 | Talbot | ........................ 180/190 |
| 5,660,245 A | * | 8/1997 | Marier et al. | ................ 180/190 |
| 5,857,385 A | | 1/1999 | Takeuchi | |
| 5,862,662 A | | 1/1999 | Fukuda et al. | |
| 5,944,133 A | | 8/1999 | Eto | |
| 5,957,230 A | | 9/1999 | Harano et al. | |
| 5,992,552 A | | 11/1999 | Eto | |
| 5,996,717 A | * | 12/1999 | Hisadomi | .................... 180/182 |
| 6,328,124 B1 | * | 12/2001 | Olson et al. | ................. 180/182 |
| 2002/0112909 A1 | * | 8/2002 | Nishijima | .................... 180/190 |
| 2003/0183436 A1 | * | 10/2003 | Karpik | ........................ 180/190 |

FOREIGN PATENT DOCUMENTS

JP 9-193880 7/1997

OTHER PUBLICATIONS

European Search Report dated Jan. 21, 2005. European Patent Application No. EP 02017710.*

* cited by examiner

*Primary Examiner*—Anne Marie Boehler
(74) *Attorney, Agent, or Firm*—Knobbe, Martens, Olson & Bear, LLP (57) ABSTRACT

A snowmobile has a body frame. A front frame is coupled with the body frame. The front frame is made of a casting. A pair of swing units are swingably supported by the front frame at first ends of the swing units. A pair of skis are supported by the swing units at second ends of the skies. A pair of suspension assemblies are connected with the front frame at first ends of the suspension assemblies. The suspension assemblies also are connected with the second ends of the swing units at second ends of the suspension assemblies.

14 Claims, 10 Drawing Sheets

FRAME ASSEMBLY FOR SNOWMOBILE

RELATED APPLICATIONS

This application is based upon and claims priority to Japanese Patent Application No. 2001-241550, filed on Aug. 9, 2001, the entire contents of which is hereby expressly incorporated by reference.

BACKGROUND OF THE INVENTION

1. Field of the Invention

The present invention generally relates to a frame assembly for a snowmobile, and more particularly to an improved frame assembly for a snowmobile that supports a ski of the snowmobile.

2. Description of the Related Art

A typical snowmobile includes a frame assembly, a drive assembly including A drive belt that engages the terrain, and a slide rail unit that supports the drive belt. The frame assembly carries an engine which powers the drive belt through a suitable transmission and drive mechanism. Typically, a pair of front skis depends from the frame assembly for steering the snowmobile. A steering handle is disposed in the rider's area so that the rider can operate the steering handle. A steering linkage couples the skis with the steering handle. Also, a pair of suspension assemblies is provided between the frame assembly and the skis for absorbing shocks generated during movement over rough terrain.

SUMMARY OF THE INVENTION

On aspect of the present invention includes the realization that certain conventional snowmobile frames, which are formed from multiple pieces connected together, can have insufficient rigidity due to deformation or distortion among the respective pieces in some combinations. In addition, due to accumulated dimensional variations of the respective pieces and/or accumulated errors made when the pieces are assembled, the depending components such as swing units, skis and/or suspension assemblies can be out of proper positions in some arrangements.

A need therefore exists for an improved frame assembly for a snowmobile that can have sufficient rigidity for supporting depending components and can keep accurate positions of the components relative to the frame assembly and among them.

In accordance with one aspect of the present invention, a snowmobile comprises a frame assembly. A drive assembly depends from the frame assembly and is adapted to abut the terrain so as to propel the frame assembly along the terrain. The frame assembly comprises a body frame. A front frame is coupled with the body frame. The front frame is made of a casting. A swing unit is swingably supported by the front frame at a first end of the swing unit. A ski is supported by the swing unit at a second end of the swing unit. A suspension assembly is connected with the front frame at a first end of the suspension assembly and is connected with the second end of the swing unit at a second end of the suspension assembly.

In accordance with another aspect of the present invention, a snowmobile comprises a frame assembly. An drive assembly depends from the frame assembly and is adapted to abut the terrain so as to propel the frame assembly along the terrain. The frame assembly comprises a body frame. A support unit is disposed in front of the body frame and is coupled with the body frame. The support unit comprises at least two sections coupled with each other. Each one of the sections is made of a casting. A pair of swing units is provided. A first end of each one of the swing units is swingably supported by each one of the sections. A pair of skis is provided. Each one of the skies is supported by a second end of each one of the swing units.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention. The drawings of the illustrated arrangement comprise twelve figures.

DETAILED DESCRIPTION OF THE PREFERRED EMBODIMENT

Figure 1:
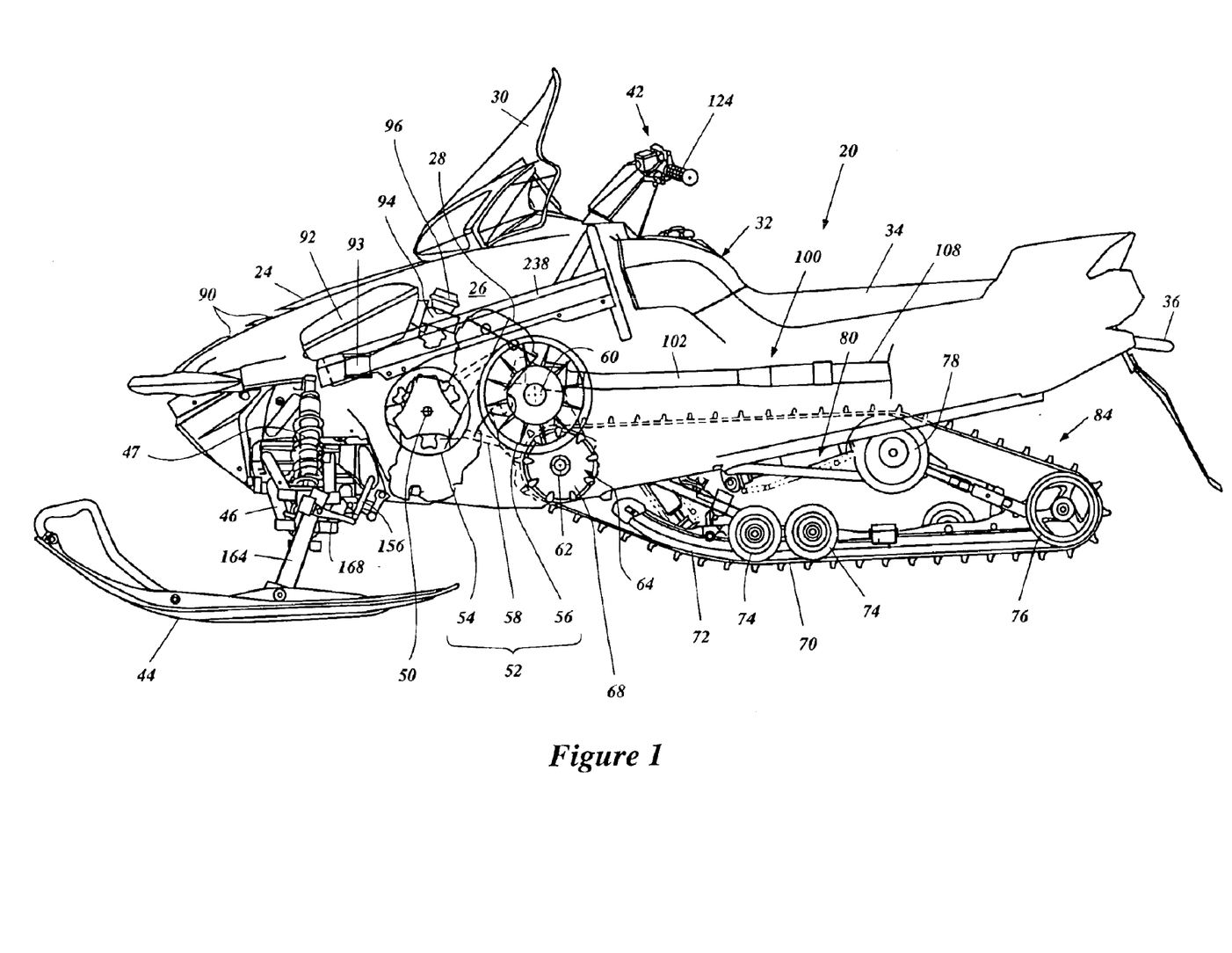
FIG. 1 is a side elevational view of a snowmobile having a frame assembly arranged and configured in accordance with certain features, aspects and advantages of the present invention. Certain portions are illustrated as being broken away and other internal portions are shown in hidden line.
Figure 2:
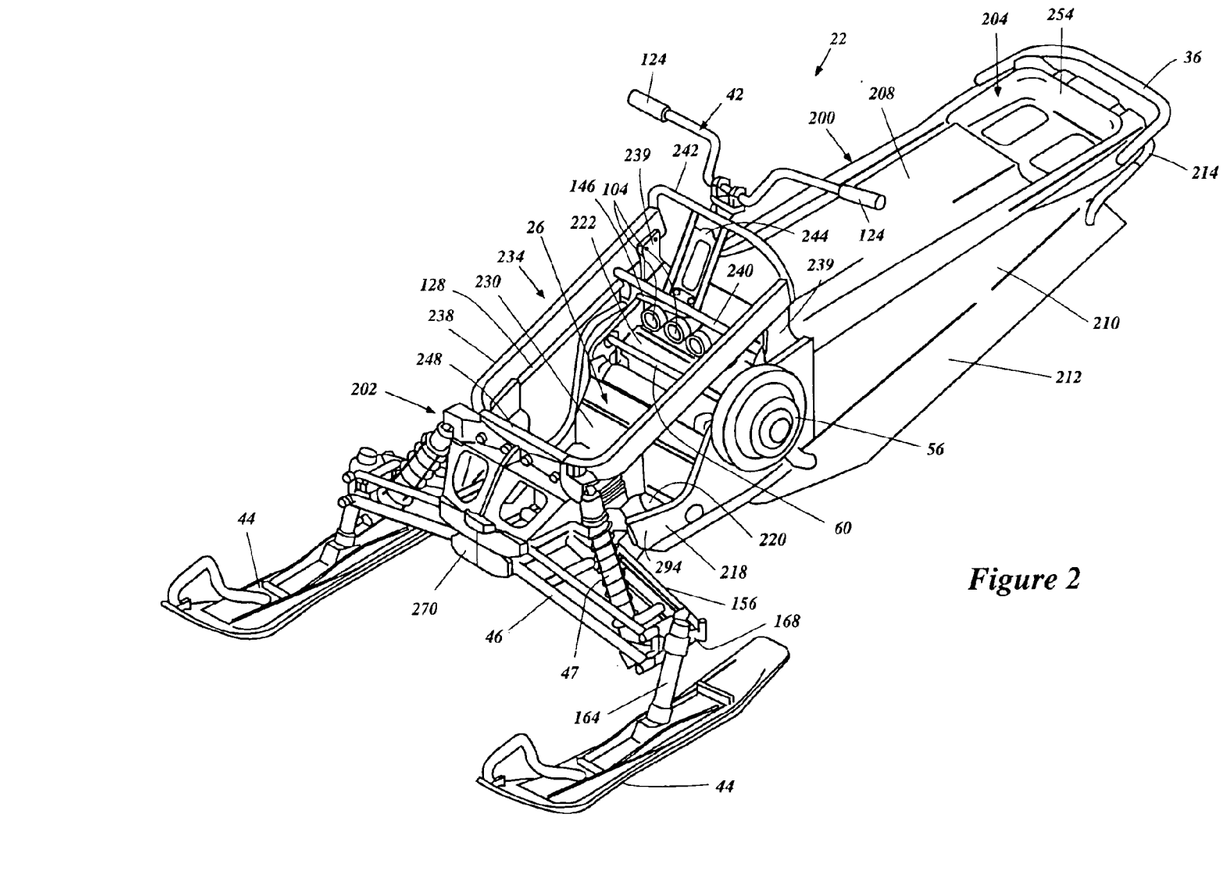
FIG. 2 is a perspective view of the frame assembly and depending components

With particular reference to FIGS. 1 and 2, an overall construction of a snowmobile 20 featuring certain features, aspects and advantages of the present invention will be described.

The snowmobile 20 generally comprises a frame assembly 22 (FIG. 2) that carries a number of other components of the snowmobile 20. The frame assembly 22 is described in greater detail below. A forward body cover 24 is disposed over a forward portion of the frame assembly 22. As illustrated in FIG. 1, the forward body cover 24 covers, in part, an engine compartment 26 in which an engine 28 is mounted. The engine 28 preferably is an in-line, four-cylinder, water-cooled, four-cycle engine and is described in greater detail below.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to appear to blend together for aesthetic and other reasons.

Rearward of the fuel tank 32, a seat 34 is mounted to the frame assembly 22. Rearward of the seat 34 is positioned a grab bar 36 that can be used to raise a rear portion of the snowmobile 20 for turning and maneuvering when the snowmobile 20 is not being ridden.

Figure 3:
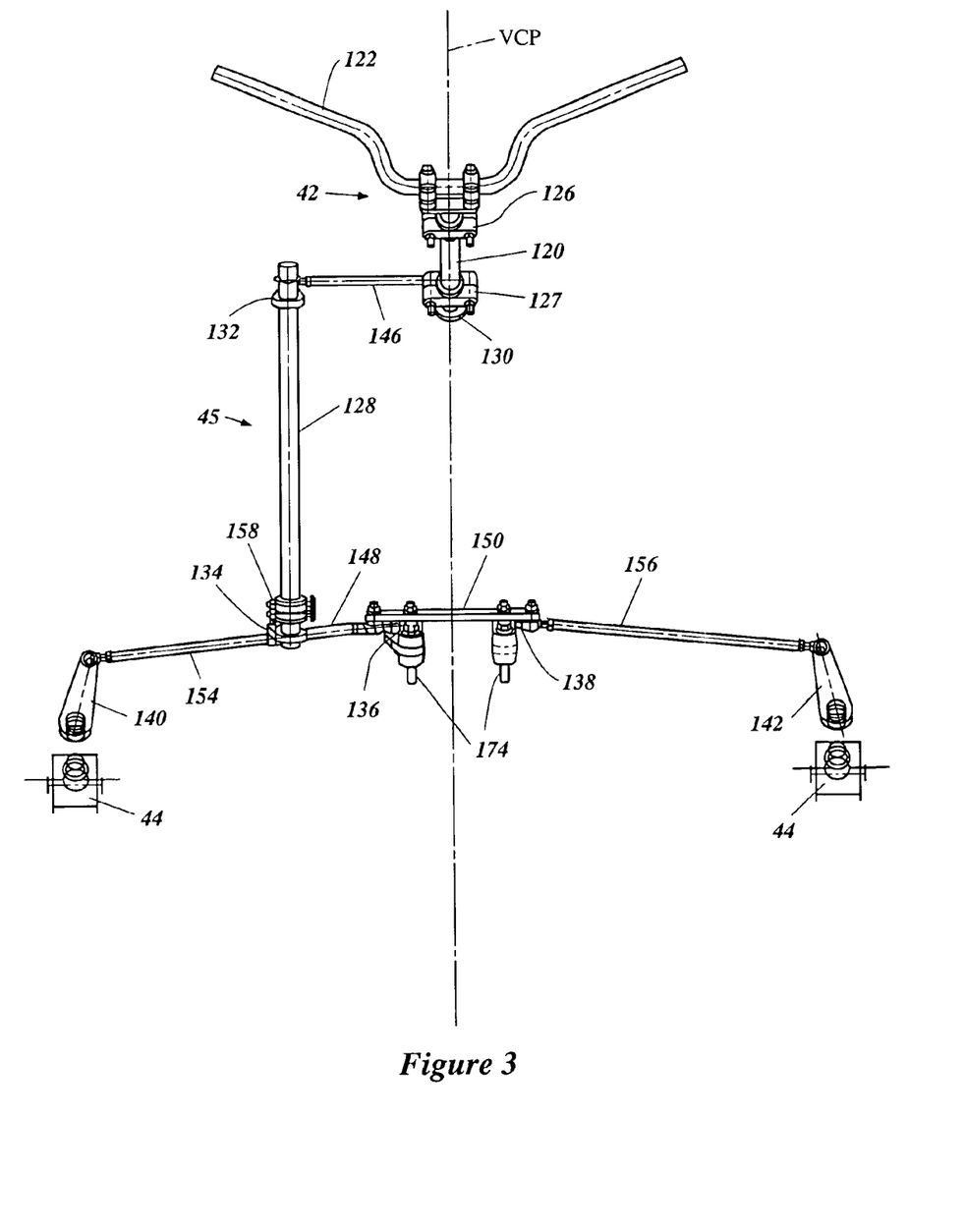
FIG. 3 is a front elevational view of a steering system of the snowmobile. Some portions are schematically illustrated.
Figure 4:
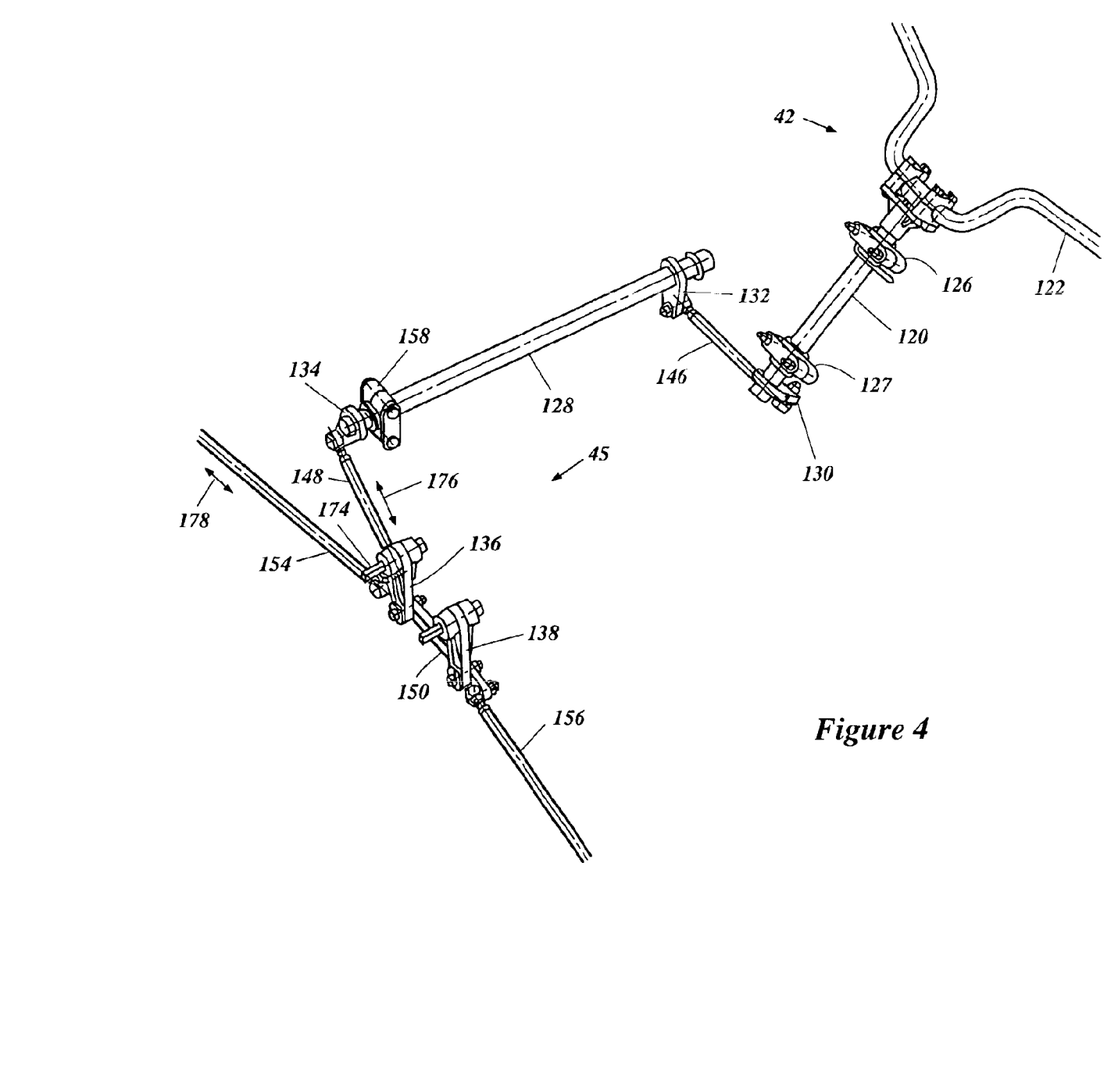
FIG. 4 is a partial perspective view of the steering system of FIG. 11.

Forward of the seat 34 and the fuel tank 32 is a steering handle assembly 42. The steering handle assembly 42 can carry appropriate controls and can be coupled to a pair of front skis 44 by a steering linkage 45 (FIGS. 3 and 4). The steering handle assembly 42 and the steering linkage 45 is described in greater detail below with reference to FIGS. 3 and 4. As the handle assembly 42 is turned, the skis 44 pivot clockwise and counterclockwise about an attachment location. By pivoting the skis 44, the direction of the snowmobile 20 can be altered.

The skis 44 are mounted to the frame assembly 22 though a pair of swing units 46. A pair of suspension assemblies 47 also is provided between the frame assembly 22 and the skis 44. Each suspension assembly 47 preferably comprises a shock absorber unit (for example, a cylinder type) and a coil spring to absorb shocks and vibrations generated during movement over rough terrain, although any other constructions can be applied.

Figure 7:
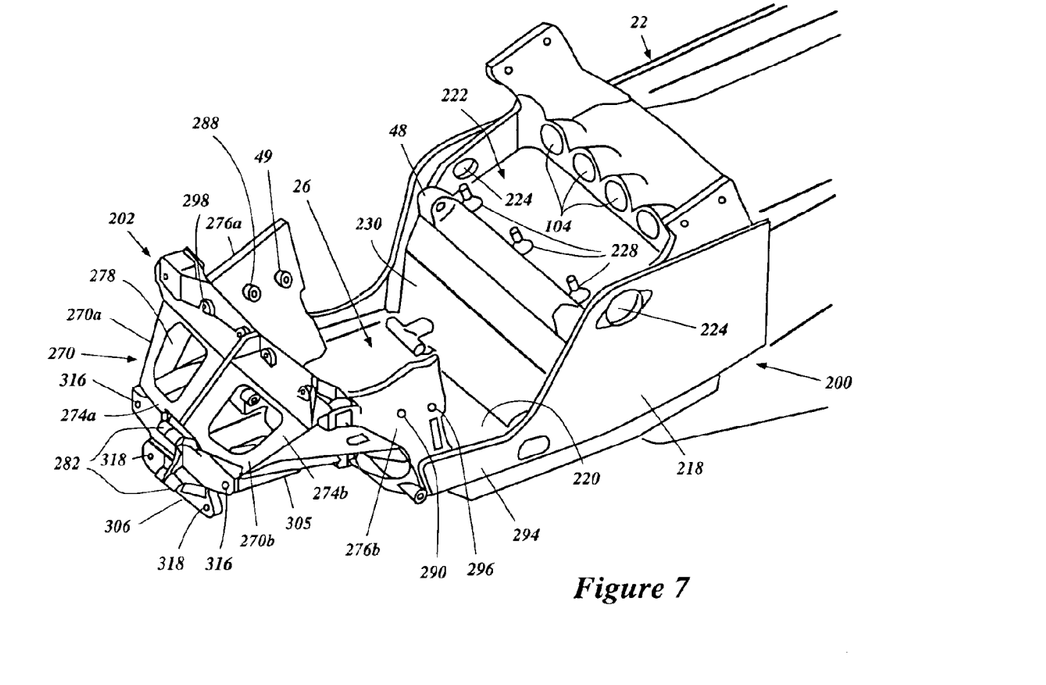
FIG. 7 is a partial perspective view of the frame assembly with the depending components and the reinforcement wholly removed.

The engine 28 is mounted to the frame assembly 22 in any suitable manner. As illustrated in FIG. 7, a set of mount bosses 48, 49 can be used to secure the engine 28 to the frame assembly 22. The illustrated engine 28 has resilient engine bosses cooperating with the mount bosses 48, 49. Alternatively, the mount bosses 48, 49 can be resilient. By mounting the engine 28 with the resilient mounts, vibrations caused by operation of the engine 28 are reduced or substantially eliminated before transmission through the frame assembly 22 to the operator.

With reference to FIG. 1, the engine 28 in the illustrated arrangement is inclined rearwardly relative to a vertical direction, and is mounted transversely within the engine compartment 26. Cylinders of the engine 28 extend side-by-side across a width of the snowmobile 20. In some arrangements, engines having differing numbers of cylinders, different cylinder configurations (e.g., V, W, opposing, etc.), different orientations (e.g., vertical) and different operating principles (e.g., two-stroke, rotary, diesel, etc.) can be used.

The engine 28 also comprises a crankshaft (not shown) that extends transversely and an output shaft 50 extending parallel to the crankshaft and is driven by the crankshaft. The output shaft 50 drives a transmission, which is a continuously variable transmission 52 in the illustrated arrangement. Other transmissions also can be used. In the illustrated arrangement, the transmission 52 comprises a drive pulley 54, a driven pulley 56 and a v-belt 58. The output shaft 50 rotates the drive pulley 54. The output shaft 50 and the drive pulley 54 can be connected together through a clutch, a centrifugal clutch, a sprag clutch, or can be directly connected together.

The drive pulley 54 powers the driven pulley 56 with the v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62. The sprockets are connected together by a chain in one arrangement and these three components are disposed within a chain box (not shown).

The drive shaft 62 powers a drive unit 64. The drive unit 64 generally comprises a plurality of drive wheels 68. The illustrated drive unit 64 comprises four drive wheels 68. The drive wheels 68 provide a motive force to a drive belt 70, which is commonly used in the snowmobile industry. The outer surface of the drive belt 70 abuts the terrain.

The drive belt 70 is guided around a preferred path on a pair of slide rails 72, a plurality of suspension wheels 74, and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly 22 with a rear suspension system 80. Any suitable rear suspension system 80 can be used and certain portions of the rear suspension system 80 have been schematically illustrated in the figures.

The drive belt 70, the slide rails 72, the suspension wheels 74, the main rear suspension wheels 76, the idle roller 78 and the rear suspension system 80 generally form a drive assembly 84 in the illustrated embodiment.

With continued reference to FIG. 1, air is drawn into the engine compartment 26 through suitable air passages. In some arrangements, the air is drawn through ventilation openings 90 formed in the body cover 24. The air drawn or forced into the engine compartment 26, circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in a suitable manner. An inlet 93 into the air intake box 92 can extend upwardly into a lower surface of the air intake box 92.

A set of intake runners 94 extends between the air intake box 92 and the engine 28. Preferably, a charge former 96 is disposed along each of the intake runners 94. The intake runners 94 preferably extend directly rearward to the engine 28. The charge formers 96 preferably correspond to each cylinder. In some arrangements, a single charge former can be used upstream of a separation point for runners extending to individual cylinders. In addition, in the illustrated arrangement, the engine 28 is carbureted. In some arrangements, the charge formers 96 can be fuel injectors that are mounted for direct injection, indirect injection or port injection.

The air-fuel charge provided in this manner is combusted within the engine in a suitable manner. The combustion byproducts then are exhausted through a suitable exhaust system 100. In the illustrated arrangement, the exhaust system 100 extends directly rearward from the engine 28. In this manner, an exhaust runner 102 that extends rearward from the engine 28 can be tuned to the engine 28 for improved engine performance. Additionally, the length of each runner 102 can be lengthened prior to merging together with any other runners such that pulse effects on adjoining cylinders can be reduced. The exhaust runners 102 correspond to each cylinder and extend generally rearward from the engine 28. Each exhaust runner 102 is coupled to the engine 28 through openings 104 (FIGS. 2 and 7) in the illustrated arrangement. In some arrangements, a single manifold can be used.

With continued reference to FIG. 1, the runners 102 preferably are joined to merge into manifold pipes 108. The manifold pipes 108 extend rearward to a silencer box (not shown). The silencer box provides an enlarged volume into which the exhaust can flow. Exhaust energy is dissipated within the silencer box and the noise level of the exhaust can be decreased. The silencer box preferably is disposed rearward of the seat 34. A pair of exhaust pipes (not shown) preferably extends rearward from the silencer box. In some arrangements, a single exhaust pipe can extend from the silencer box. One end of the exhaust pipes preferably defines to an ultimate exhaust discharge from the snowmobile 20 such that the exhaust gases are discharged into the atmosphere.

With reference to FIGS. 3 and 4, the steering handle assembly 42 and the steering linkage 45 is described in greater detail below.

The illustrated steering handle assembly 42 preferably comprises a steering shaft 120, a handle bar 122 and a pair of grips 124 (FIGS. 1 and 2). The steering shaft 120 extends generally vertically with a top portion thereof inclining slightly rearward. The frame assembly 22 supports the steering shaft 120 with support members 126, 127 in a manner that provides for pivotal movement of the steering shaft 120 about a steering axis.

The steering linkage 45 preferably comprises a steering column 128, lever arms 130, 132, 134, 136, 138, 140, 142, link rods 146, 148, a connecting link 150 and steering rods 154, 156.

The steering shaft 120 is coupled with the lever arm 130. The lever arm 130 is connected to the lever arm 132 affixed to a top portion of the steering column 128 through the link rod 146. The frame assembly 22 supports the steering column 128 with a support member 158 in a manner that provides for pivotal movement of the steering column 128 about a steering axis. The lever arm 134 is affixed to a bottom portion of the steering column 128 and is connected to the lever arm 136 through the link rod 148. The connecting link 150 connects the lever arm 136 with the lever arm 138. The steering rods 154, 156 extend transversely from both ends of the connecting link 150. The lever arms 140, 142 are coupled with the respective outer ends of the steering rods 154, 156 on each one end and also are coupled with the skis 44 on each another end.

In the illustrated embodiment, the steering column 128 is affixed to a U-shaped tubular member 238 (FIG. 2), which is described in greater detail below, by the support member 158. The steering column 128 also is journaled on a frame member 222 (FIGS. 2 and 5–8), which is described in greater detail below.

The illustrated steering handle assembly 42 and the steering linkage 45 are arranged generally symmetrically relative to a vertical center plane VCP which extends vertically and fore to aft in a center of the snowmobile 20 when the snowmobile 20 is laid on a horizontal plane. However, the steering column 128, the lever arms 132, 134 and the link rods 146, 148 are offset from the center plane VCP toward the right side of the snowmobile 20.

Figure 5:
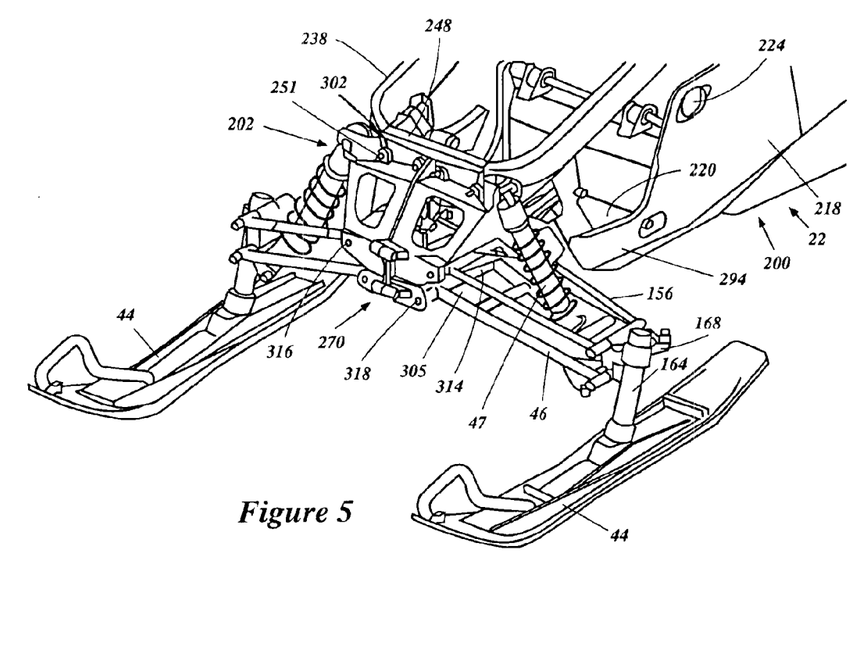
FIG. 5 is a partial perspective view of the frame assembly and the depending components shown in FIG. 2. A driven wheel of the snowmobile is detached in the figure.

With reference to FIGS. 1, 2, and 5, each ski 44 has a ski shaft (not shown) that extends generally upwardly from the ski 44 and through a holder 164 which is affixed to an outer end of each swing unit 46. The ski shaft can pivot about a ski axis of the ski shaft which is generally consistent with an axis of the holder 164. A coupling link 168 couples each steering rod 154, 156 with a top portion of the ski shaft. The ski 44 pivots about the ski axis relative to the holder 164 when the coupling link 168 pulls or pushes the ski shaft.

The lever arms 136, 138 are journaled on the frame assembly 22. In the illustrated arrangement, the lever arms 136, 138 are journaled on a cross member 172 (FIG. 12), which is described in greater detail below, by bolts 174.

With reference to FIGS. 1–5 and 10, when the operator turns the handle bar 122 right or left, the steering shaft 120 and the steering column 128 pivot about respective axes to move the link rod 148 as indicated by the arrow 176 (FIG. 4). The steering rods 154, 156 thus move as indicated by the arrow 178 to pull or push the respective coupling links 168. The ski shafts pivot about the ski axes to direct the skis 44 right or left. Accordingly, the snowmobile 20 turns to the direction that the operator desires.

With reference to FIGS. 2 and 4–7, a general construction of the frame assembly 22 is described in greater detail below.

The frame assembly 22 generally comprises a body frame 200, a front frame 202 and a rear frame 204. The body frame 200 is disposed center of the frame assembly 22 and forms a main body of the snowmobile 20. The front frame 202 is disposed forward of the body frame 200 and forms a front body of the snowmobile 20. The rear frame 204 is disposed rear of the body frame 200 and forms a rear body of the snowmobile 20.

With particular reference to FIG. 2, the body frame 200 preferably comprises an upper horizontal section 208, side vertical sections 210 and lower horizontal sections 212. The upper horizontal section 208 extends fore to aft and forms a center area of the body frame 200. The side vertical sections 210 extend vertically downwardly from both sides of the upper horizontal section 208. The lower horizontal sections 212, in turn, extend horizontally outwardly from lower ends of the side vertical sections 210. The lower horizontal sections 212 preferably form foot step areas. Foot steps (not shown) are affixed at respective forward portions of the sections 212.

Heat exchange devices (not shown) preferably are coupled with the respective lower horizontal sections 212. The heat exchange devices are part of an engine cooling system. Water delivery pipes 214 are provided to circulate cooling water within the cooling system. One of the delivery pipes 214 extends rearwardly to the rear frame 204 from the lower horizontal section 212 on the left hand side and then forwardly to the lower horizontal section 212 on the right hand side.

Preferably, the upper horizontal section 208 is formed separately from the other part of the body frame 200. The upper horizontal section 208 can be made of, for example, a sheet metal. Both sides of the upper horizontal section 208 can be lower than a center portion thereof to reinforce the section 208. The upper horizontal section 208 can be formed by, for example, a press working The side vertical sections 210 and the lower horizontal sections 212 preferably are unitarily formed with each other and is made of, for example, a sheet metal and is formed by stamping, or is made of an extruded aluminum alloy material.

The sections 208, 210, 212 can be entirely unitarily formed with each other. Alternatively, the sections 208, 210, 212 can be completely separately formed. Additionally, the sections 208, 210, 212 can be produced by any methods other than the methods described above. For example, the sections 208, 210, 212, unitarily formed or separately formed, can be produced by a mold casting, die-casting or lost-wax casting process. Similarly, the other components and/or members described below also can be formed with any metal or plastic material and can be formed by any conventional method regardless of being expressly described or not, except as explained below.

The illustrated body frame 200 additionally comprises side panels 218, a floor panel 220 and a frame member 222, which preferably are produced by the mold casting, die-casting or lost-wax casting process.

The side panels 218 are affixed to the respective side sections 210 by welding or by fasteners such as, for example, bolts or rivets. The side panels 218 define openings 224 (FIG. 7) through which the transfer shaft 60 (FIG. 1) extends. The driven pulley 56 is positioned aside the side panel 218 on the left side. The floor panel 220 extends between lower ends of the side panels 218 to form a bottom portion of the engine compartment 26.

The frame member 222 extends between upper portions of the side panels 218 and generally covers a front end of the upper horizontal section 208. The frame member 222 also defines the rear engine mounts 48 and the openings 104 for the exhaust runners 102 (FIG. 1). The frame member 222 also forms three bosses 228 onto which a heat insulator (not shown) for the exhaust system 100 is mounted. Another heat exchange device 230 for the engine 28 is disposed below the frame member 222. The cooling water of the engine 28 also circulates through the heat exchange device 230. The heat exchange device 230 preferably is affixed to the side panels 218 and the frame member 222 and form part of the frame assembly 22 together with the side panels 218.

The body frame 200 thus is rigidly formed with the foregoing components and members. To further increase the rigidity of the frame assembly 22 and to be coupled with the front frame 202, the frame assembly 22 preferably includes a frame reinforcement 234 (FIG. 2) secured to the body frame 200. The reinforcement 234 desirably is generally rectangularly shaped and advantageously is disposed generally above the engine 28. Thus, the engine 28 is positioned within a cavity defined between the side panels 218, above the floor panel 220, forward of the frame member 222, and below the reinforcement 234.

The illustrated reinforcement 234 preferably comprises a generally rectangular tubular member 238 that is bent into a U-shape. The tubular member 238 preferably is made of an extruded aluminum alloy material. Rear ends of the tubular member 238 are affixed to upwardly extending sections 239 of the frame member 222. A bight of the U-shape is disposed forwardly in the illustrated arrangement. A bar 240 extends between the two legs of the U-shaped tubular member 238 at the end opposite the bight. The bar 240 reinforces the open end of the U-shape defined by the tubular member 238. A second bar 242 extends upward and between rear ends of the tubular member 238 to further reinforce the reinforcement 234. Additionally, a support unit 244 extends upward and rearward from the bar 240 to the second bar 242. The illustrated steering handle assembly 42 is affixed to the support unit 244 by the support members 126, 127 (FIGS. 3 and 4).

Figure 6:
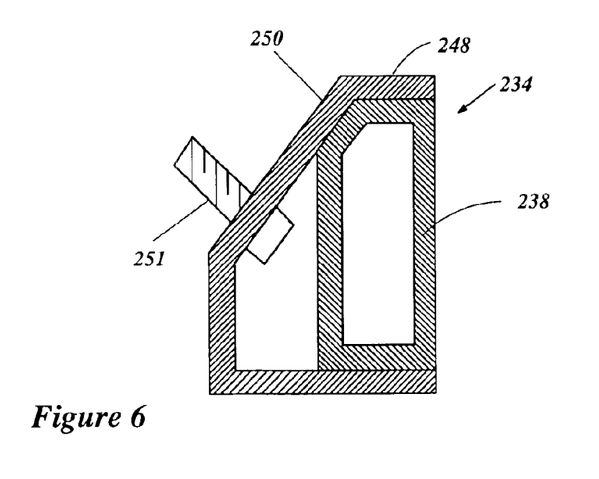
FIG. 6 is a side elevational, cross-sectional view of a frame reinforcement of the frame assembly.

A holder member 248 is coupled with a front portion of the tubular member 238 by welding or by fasteners such as, for example, bolts or rivets. The holder member 248 preferably is made of sheet metal and is formed by a bending process. With reference to FIG. 6, the front portion of the tubular member 238 is nested in a recessed portion defined by the holder member 248. The holder member 248 also defines a slant surface 250. Four bolts 251, for example, extend through the slant surface 250 with threaded portions thereof extending generally upwardly and forwardly.

With reference to FIG. 2, the rear frame 204 preferably comprises a generally flat shaped member 254 having a recessed portion. The illustrated member 254 of the rear frame 204 can be formed with a casting. Alternatively, the member 254 can be formed with sheet metal by a press or stamping process. The rear frame 204 is coupled with the body frame 200 in a suitable manner. The exhaust silencer box (not shown) is disposed on the rear frame 204. The grab bar 36 and the water delivery pipe 214 are fixed to the rear frame 204.

With continued reference to FIGS. 2, 5 and 7 and with additional reference to FIGS. 8–12, the front frame 202 of the frame assembly 22 is described in greater detail.

The front frame 202 preferably comprises a front support unit 270. The support unit 270 preferably comprises a pair of generally symmetrically formed members 270a, 270b that are coupled with each other at the vertical center plane VCP (FIG. 3). Preferably, the unit members 270 are made of aluminum alloy and are formed by, for example, a mold casting, a die-casting or lost-wax casting process.

Each unit member 270a, 270b has a front section 274a, 274b and a side section 276a, 276b extending generally normal to the front section 274a, 274b. Upper surfaces of the front sections 276a, 276b slant rearwardly and upwardly. A relatively large aperture 278 is formed at each front section 274a, 274b to make each member 270a, 270b lighter. The front sections 276a, 276b define generally vertically extending flat surfaces below and at the forward ends of the slant surfaces.

Figure 11:
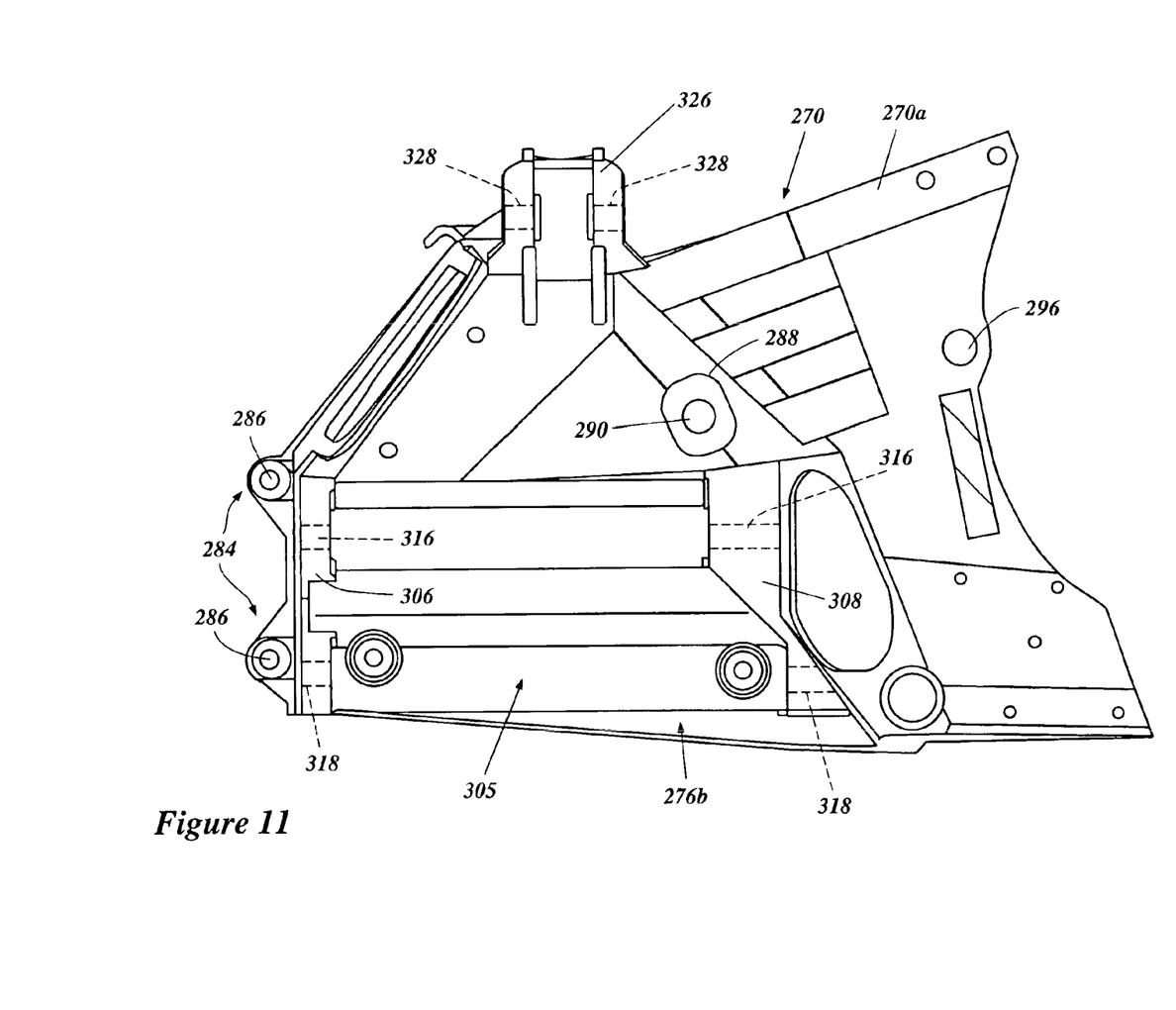
FIG. 11 is a side elevational view of the front frame of FIG. 9.

The illustrated unit members 270a, 270b are coupled with each other by two sets of bolts and nuts 282 at coupling portions 284 which are formed on the flat surfaces so as to meet each other. FIG. 11 illustrates bolt holes 286 for the bolts. The cross member 172 (FIG. 12) also is used to couple the members 270a, 270b with each other. The cross member 172 bridges mount bosses 288 (FIGS. 7, 11 and 12) formed on the respective side sections 276a, 276b. Bolt holes 290 extend through the mount bosses 288. Two bolts (not shown) are inserted into the bolt holes 290 and further through bolt holes (not shown) defined at each end of the cross member 172 to rigidly fix the cross member to the mount bosses 288.

Each side section 276a, 276b is coupled with a forward-most end 294 (FIGS. 2, 5 and 7) of each side panel 218 by welding or by suitable fasteners such as, for example, bolts or rivets. Each side section 276a, 276b also defines the forward engine mount boss 49 through which a bolt hole 296 is formed. The engine 28 mounted onto the mount bosses 49 connects the respective side sections 276a, 276b and connects the front frame 202 to the body frame 200.

Each front section 274a, 274b of the unit member 270a, 270b defines two bolt holes 298 at an uppermost portion 300 thereof. The bolts 251 (FIG. 6) extend through the bolt holes 298. Nuts 302 are screwed into the bolts 251 to rigidly couple the uppermost portion 300 of the unit members 270a, 270b with the holder member 248 of the frame reinforcement 234.

Figure 8:
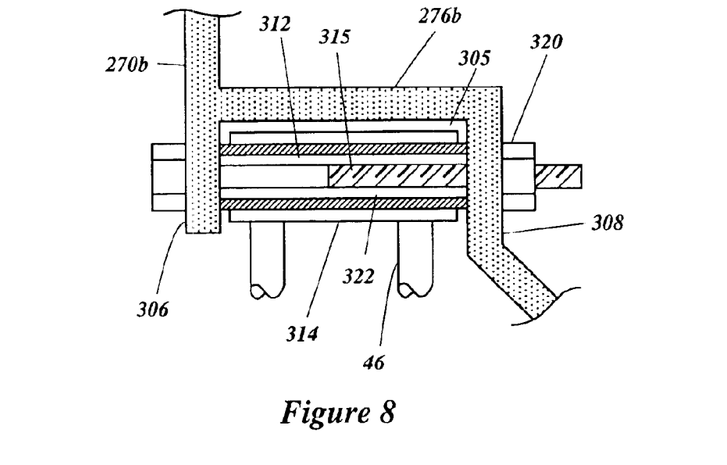
FIG. 8 is a partial, cross-sectional, top plan view of the frame assembly and a swing unit coupled with each other in a recessed portion.

With particular reference to FIG. 8, each unit member 270a, 270b supports the swing unit 46 on the side section 276a, 276b. Each swing unit 46 in the illustrated arrangement is formed with a pair of linked tubular members disposed above and below, although any other construction can be applied. Each side section 276a, 276b defines a recessed portion 305 sunken inwardly. Projections 306, 308 thus are defined on fore and aft sides of the recessed portion 305 on each of the side section 276a, 276b.

Each swing unit 46 is placed at each recessed portion 305 with collars 312 borne in apertures formed at bosses 314 of upper and lower linked tubular members of the swing unit 46. Each projection 306, 308 defines upper and lower bolt holes 316, 318 at corresponding positions. Bolts 315 extend through the bolt holes 316, 318 and the collars 312. Nuts 320 complete respective couplings of the bolts 315 with the projections 306, 308. A space 322 is formed between each collar 312 and each bolt 315. Thus, the unit members 270a, 276b can swingably support the swing units 46 on their own side sections 276a, 276b.

As shown in FIG. 11, the respective unit members 270a, 270b are coupled with each other at the coupling portions 284 which are located adjacent to both the forward projections 306 where the swing units 46 are journaled. Although the swing units 46 pull the unit members 270a, 270b outwardly during operation (i.e., in a direction such that the members 270a, 270b would otherwise separate from one another), the connection of the unit members 270a, 270b with each other is maintained because the moment of the pulling force is small due to the arrangement.

With particular reference to FIGS. 2, 5, 10 and 11, a top portion of the side section 276a, 276b of each unit member 270a, 270b forms a mount portion 326 of a top end of each suspension assembly 47. Apertures 328 are defined at each mount portion 326. The top end of the suspension assembly 47 is journaled at the mount portion 326 with a shaft extending through the apertures 328. The top end of the suspension assembly 47 pivots about an axis of the shaft extending fore to aft and along the vertical center plane VCP (FIG. 11). A lower end of each suspension assembly 47 is affixed to a portion of the lower linked member of each swing unit 46 where the holder 164 is attached, or is directly affixed to the holder 164.

Figure 9:
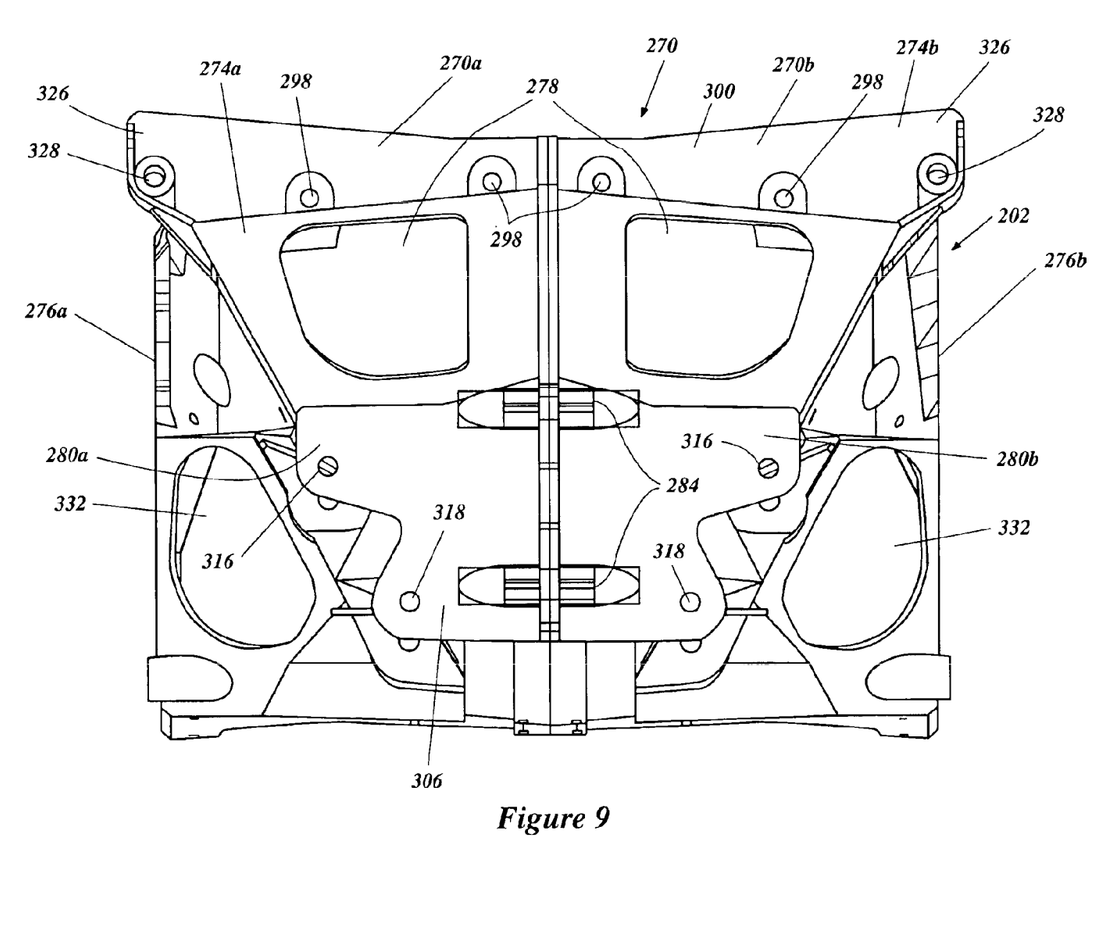
FIG. 9 is a front elevational view of a front frame of the frame assembly.
Figure 10:
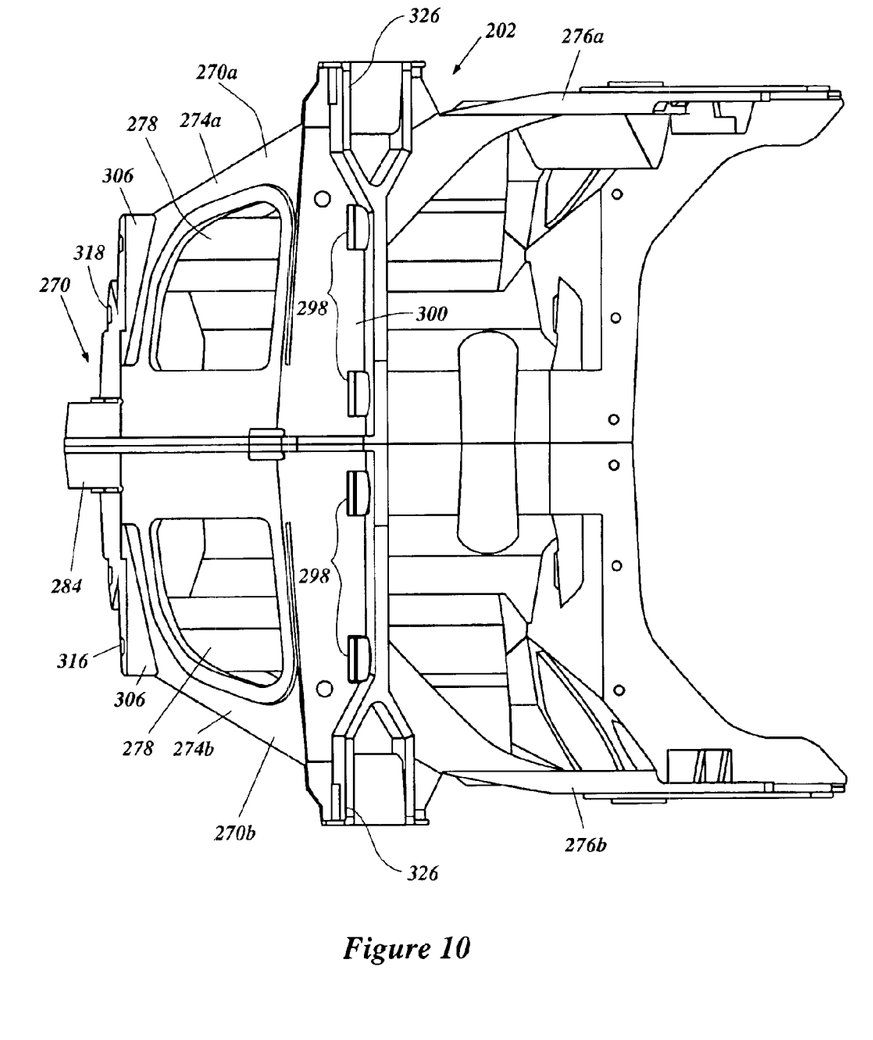
FIG. 10 is a top plan view of the front frame of FIG. 9.
Figure 12:
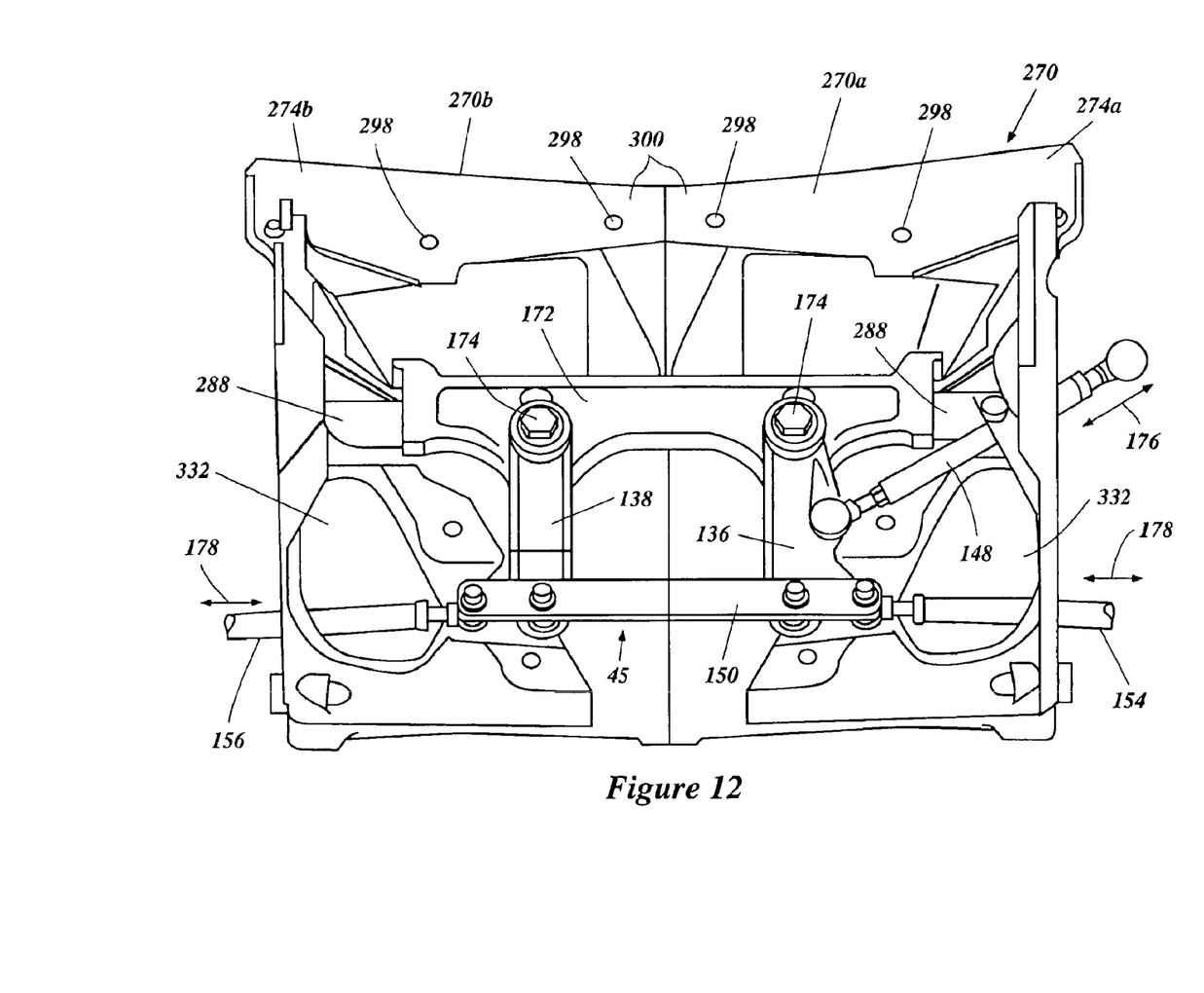
FIG. 12 is a rear elevational view of the front frame of FIG. 9.

With particular reference to FIGS. 9, 11 and 12, the illustrated cross member 172 supports a portion of the steering linkage 45. More specifically, as described above, the cross member 172 journals the lever arms 136, 138. The unit members 270a, 270b form openings 332 through which the steering rods 154, 156 extend transversely.

In the illustrated embodiment, because each unit member 270a, 270b comprises a single body formed in a casting process, the rigidity thereof is sufficient to form part of the frame assembly 22 and also is sufficient to support the swing unit 46 and the suspension assembly 47. Additionally, positioning of the various mounting bosses, recesses, and bolt holes for the swing unit 46 and the suspension assembly 47 can be more accurately reproduced. Accordingly, higher durability and reliability can be obtained.

The shape of the unit members 270a, 270b, provides a further advantage. For example, because the front sections 274a, 274b and their respective side sections 276a, 276b are formed substantially normal to each other, the unit members 270a, 270b are provided with enhanced rigidity. Additionally, the projections 306, 308 formed along with the recessed portions 305 not only can protect the swing units 46 and components around the swing units 46 but also can increase the rigidity of the unit members 270a, 270b.

The illustrated front frame 202 thus can contribute to provide a simple, durable and reliable construction of the snowmobile.

The same snowmobile is disclosed in co-pending U.S. applications, both titled FRAME ASSEMBLY FOR SNOWMOBILE, the entire contents of which are hereby expressly incorporated by reference.

Although the present invention has been described in terms of a certain embodiment, other embodiments apparent to those of ordinary skill in the art also are within the scope of this invention. Thus, various changes and modifications may be made without departing from the spirit and scope of the invention. The scope of the present invention is intended to be defined only by the claims that follow.

What is claimed is:

1. A snowmobile comprising a frame assembly, and a drive assembly depending from the frame assembly and adapted to abut the terrain so as to propel the frame assembly along the terrain, the frame assembly comprising a body frame, a front frame coupled with the body frame, the front frame comprising a casting, a swing unit swingably supported by the casting at a first end of the swing unit, a ski supported by the swing unit at a second end of the swing unit, and a suspension assembly connected with the casting at a first end of the suspension assembly and connected with the second end of the swing unit at a second end of the suspension assembly, wherein the casting comprises a front section and a side section extending generally normal to the front section, the first end of the swing unit and the first end of the suspension assembly are journaled on the side section, and wherein the side section of the casting forms a recessed portion recessed inwardly, the first end of the swing unit is nested in the recessed portion.

2. The snowmobile as set forth in claim 1, wherein the casting comprises a front section and a side section extending generally normal to the front section, the first end of the swing unit and the first end of the suspension assembly are journaled on the side section.

3. The snowmobile as set forth in claim 1, wherein the front frame comprises at least two castings coupled with each other, each casting has a set of the swing units.

4. The snowmobile as set forth in claim 3, wherein the castings are generally symmetrically formed with each other.

5. The snowmobile as set forth in claim 3, wherein the castings are connected with each other at a location adjacent to the first ends of the swing units.

6. The snowmobile as set forth in claim 3, wherein the castings are connected with each other by a cross member.

7. The snowmobile as set forth in claim 6, wherein each one of the castings comprises a front section and a side section extending generally normal to the front section, the cross member connecting the respective side sections.

8. The snowmobile as set forth in claim 3 additionally comprising a steering linkage connected to the ski, the castings being connected with each other by a cross member, the steering linkage, at least in part, being journaled on the cross member.

9. A snowmobile comprising a frame assembly and an drive assembly depending from the frame assembly and adapted to abut the terrain so as to propel the frame assembly along the terrain, the frame assembly comprising a body frame, a support unit disposed in front of the body frame and coupled with the body frame, the support unit comprising at least two sections coupled with each other, each one of the sections being made of a casting, a pair of swing units, a first end of each one of the swing units being swingably supported by each one of the sections, and a pair of skis, each one of the skis being supported by a second end of one of the swing units, wherein each one of the sections of the support unit comprises a front portion and a side portion extending generally normal to the front portion, each of the first ends of the swing units being journaled on a respective side portion, and wherein each one of the side portions forms a recessed portion recessed inwardly, each of the first ends of the swing units being nested with a respective recessed portion.

10. The snowmobiles as set forth in claim 9 additionally comprising a pair of suspension assemblies, a first end of each one of the suspension assemblies being connected with a respective support unit, a second end of each one of the suspension assemblies being connected with the second end of a respective swing unit.

11. The snowmobile as set forth in claim 9, wherein each one of the sections of the support unit comprises a front portion and a side portion extending generally normal to the front portion, each of the first ends of the swing units being journaled on a respective side portion.

12. The snowmobile as set forth in claim 9, wherein the sections of the support unit are connected to each other at a location adjacent to the first ends of the swing units.

13. The snowmobile as set forth in claim 9, wherein the sections of the support unit are connected to each other by a cross member.

14. The snowmobile as set forth in claim 9 additionally comprising a steering linkage connected to the skis, the sections of the support unit being connected with each other by a cross member, the steering linkage, at least in part, being journaled on the cross member.

* * * * *